(12) United States Patent
Elzur

(10) Patent No.: US 10,949,235 B2
(45) Date of Patent: Mar. 16, 2021

(54) NETWORK SEMANTICS INTEGRATED INTO CENTRAL PROCESSING UNIT (CPU) CHIPSET

(71) Applicant: Intel Corporation, Santa Clara, CA (US)

(72) Inventor: Uri Elzur, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 15/376,186

(22) Filed: Dec. 12, 2016

(65) Prior Publication Data

US 2018/0165107 A1 Jun. 14, 2018

(51) Int. Cl.
*G06F 9/455* (2018.01)
(52) U.S. Cl.
CPC ............... *G06F 9/45558* (2013.01); *G06F 2009/45595* (2013.01)
(58) Field of Classification Search
CPC ............... G06F 9/45558; G06F 2009/45595
See application file for complete search history.

(56) References Cited

U.S. PATENT DOCUMENTS

| | | | | |
|---|---|---|---|---|
| 5,197,146 | A * | 3/1993 | LaFetra | G06F 12/0824 711/120 |
| 8,762,125 | B2 | 6/2014 | Errickson et al. | |
| 10,103,902 | B1 * | 10/2018 | Sampath | H04L 12/467 |
| 2010/0115228 | A1 * | 5/2010 | Parker | G06F 12/0284 711/203 |
| 2011/0010525 | A1 * | 1/2011 | Binkert | G06F 15/17343 712/29 |
| 2013/0219148 | A1 | 8/2013 | Chen et al. | |
| 2014/0181470 | A1 | 6/2014 | Finney et al. | |
| 2015/0254189 | A1 * | 9/2015 | Coppola | G06F 12/145 711/163 |

OTHER PUBLICATIONS

International search report for PCT application No. PCT/US2017/062697, dated Mar. 30, 2018 (3 pages).
Written opinion for PCT application No. PCT/US2017/062697, dated Mar. 30, 2018 (9 pages).

* cited by examiner

*Primary Examiner* — Wissam Rashid
(74) *Attorney, Agent, or Firm* — Compass IP Law, PC

(57) ABSTRACT

Disclosed are mechanisms to support integrating network semantics into communications between processor cores operating on the same server hardware. A network communications unit is implemented in a coherent domain with the processor cores. The network communications unit may be implemented on the CPU package, in one or more of the processor cores, and/or coupled via the coherent fabric. The processor cores and/or associated virtual entities communicate by transmitting packet headers via the network communications unit. When communicating locally compressed headers may be employed. The headers may omit specified fields and employ simplified addressing schemes for increased communication speed. When communicating locally, data can be moved between memory locations and/or pointers can be communicated to reduce bandwidth needed to transfer data. The network communications unit may maintain/access a local policy table containing rules governing communications between entities and enforce such rules accordingly.

25 Claims, 9 Drawing Sheets

NETWORK SEMANTICS INTEGRATED INTO CENTRAL PROCESSING UNIT (CPU) CHIPSET

BACKGROUND

Cloud computing technology supports on-demand elastic provisioning of resources for data center tenants. Virtualization techniques used for cloud computing also allow for resource sharing. For example, Software Defined Infrastructure (SDI) allows for complete programmatic control of computing infrastructure hardware and Software Defined Networking (SDN) allows for separate control of the networking control plane from the networking data plane. Such technological paradigms allow for many combinations of hardware and software resources. Various communication protocols support data exchanges between virtualized network resources. Such communication protocols require significant operational overhead in terms of software control resources. Accordingly, significant networking hardware resources are dedicated to implement the software resources to support such communications exchanges between the virtualized network resources.

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

DETAILED DESCRIPTION OF THE DRAWINGS

Figure 1:
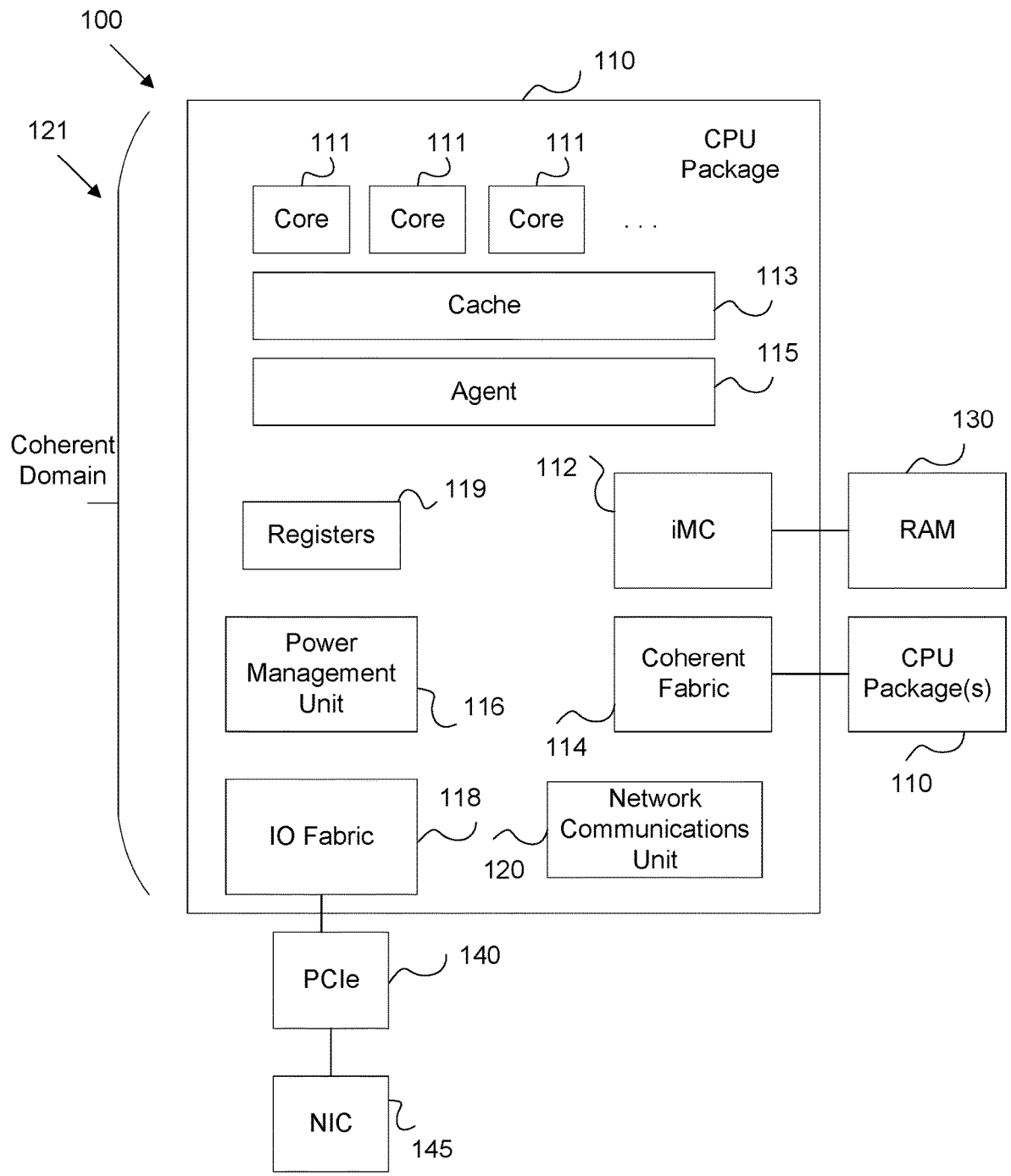
FIG. 1 is a block diagram of an embodiment of a multi-core central processing unit (CPU) system including a network communications unit implemented in a CPU package.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Disclosed herein are mechanisms to support integrating network semantics into communications between processor cores operating on the same server hardware. A network communications unit is implemented in a coherent domain with the processor cores. The coherent domain is a group of processing components that consistently share hardware resources, for example via a coherent fabric. The network communications unit may be implemented on the CPU package, in one or more of the processor cores, and/or coupled via the coherent fabric. The network communications unit supports hardware acceleration for faster communication between processor cores. The processor cores and/or associated virtual entities (e.g. VMs or containers) communicate by transmitting, according to network semantics for efficient processing, the relevant packet headers via the network communications unit. However, when communicating locally (e.g. within the coherent domain and/or between processor cores on the same server) compressed headers may be employed. For example, the headers may omit specified fields and employ simplified addressing schemes for increased communication speed. Full packet headers and/or mappings to globally mutable addresses may be generated and stored for use when a packet is transmitted outside of the coherent domain (e.g. between separate servers). Further, when communicating locally, data can be moved between memory locations and/or pointers only can be communicated (e.g. data is not moved) to reduce bandwidth needed to transfer data. The network communications unit may maintain a local forwarding table containing locally relevant forwarding information. The small size of the local forwarding table may reduce table look-up time and hence increase communication speed. Further, the network communications unit may maintain/access a local policy table containing local rules governing communications between entities and enforce such rules accordingly. In addition, the network communications unit may check the headers to verify that communications are network semantics compliant.

FIG. 1 is a block diagram of an embodiment of a multi-core central processing unit (CPU) system 100 including a network communications unit 120 implemented in a CPU package 110. The CPU package 110 is a structural unit configured to contain one or more processor dies containing processor cores 111 and electrically couple the processor cores 111 to other components. The CPU package 110 may comprise semiconductor material, conductive contacts (e.g. made of gold), and a sealing compound to prevent damage to components. The CPU package 110 contains a plurality of components configured to execute instructions. Each component includes a set of hardware configured to provide a set of functionality.

The processor cores 111 are general purpose processing units including transistors embedded into semi-conductive material, each known as a processor die. The processor cores 111 execute instructions by operation of the transistors. For example, the processor cores 111 communicate with other components to obtain data. The processor cores 111 forward the data through a corresponding transistor network to process the data, for example via execution of corresponding instructions. The processed data and/or the results of the execution may then be stored back in memory. The processor cores 111 may also execute operating system entities, such as Linux kernels, hypervisors, etc. An operating system entity is an operating environment that operates applications, such as virtual entities. A virtual entity is a software machine that emulates a hardware machine. As such, a processor core 111 may execute instructions to operate one or more operating system entities, such as a kernel or a hypervisor, which instantiates one or more virtual entities, such as a docker container or a VM. Multiple virtual entities may operate on the same processor core 111 or same group of processor cores 111. Further, virtual entities may be designed to restrict sharing of information, for example when different virtual machines are operated on behalf of different tenants. Accordingly, communication between processor cores 111 may be controlled by policies, which are rules governing communications between a source processor core 111 and a destination processor core 111. For example, policies may include access control lists (ACLs), Security groups, Group-Based Policy (GBP), Service Function Chaining (SFC) policies, etc. Such policies may be set by an administrative authority, such as a Software Defined Network (SDN) Controller, infrastructure owner, system administrator, Hardware-assisted Virtual Machine (HVM), etc.

The system 100 includes various components to support the execution of instructions by the processor cores 111. Such supporting components in the CPU package 110 may include a cache 113, one or more agents 115, a power management unit 116, an integrated memory controller (iMC) 112, registers 119, a network communications unit 120, and an input output (IO) fabric 118. It should be noted that the list of components discussed herein in exemplary and simplified for purposes of clarity of discussion. Package 110 may include many other special purposes components, and some of the components disclosed herein may be omitted without departing from the present disclosure. Further, the components are electrically coupled as needed to perform their respective functions. Specific couplings are not depicted in order to simplify and enhance the clarity of the disclosed embodiments.

The cache 113 is any memory positioned in close proximity to the processor cores 111 to increase access speed during processing. Cache 113 may include a plurality of cache units, configured in layers, to support corresponding groups of processor cores 111. For example, each processor core 111 may include a local cache, which may be referred to as a layer one cache. A layer two cache may be shared amongst a plurality of processor cores 111. Further, a last level cache may be shared by all of the processor cores 111 on package 110. Cache 113 stores data for processor cores 111 and promotes data sharing between processor cores 111 during multi-core execution related processes. The cache 113 is configured to receive, store, and return data to cores 111 on command.

The caches 113 are managed by agent 115, which is any device configured to manage cache 113 memory and/or system 100 access on behalf of the processor cores 111. In some embodiments, caches 113 are configured to act in a coherent fashion. In a coherent cache configuration, multiple caches 113 store the same data in different locations for use by different processor cores 111. Coherence indicates the data maintained consistently, such that a change to data in a first location results in corresponding data in another location being altered or discarded accordingly. The agent 115 may be configured to maintain cache coherence between a plurality of caches 113, in which case the agent 115 may be referred to as a coherence engine (C-Box). Agent 115 may also act as a system interface (S-Box) between the caches 113 and the other components. Agent 115 may also comprise a router (R-Box) for routing data between the cores 111 (e.g. via the S-Box) and the other uncore FUBs.

The processor cores 111 often operate on data that is too large to exist completely on cache 113. Accordingly, package 110 is coupled to random access memory (RAM) 130. RAM is short term memory positioned off of the CPU package 110. The RAM 130 is shared by the processor cores 111. The RAM 130 holds more data than cache 113, but is positioned farther away from the cores 111 than cache 113. Hence, the RAM 130 has a slower access time than cache 113. For example, an application and/or an active application function may be stored in RAM 130. Portions of the active application functions are communicated from the RAM 130 to the cache 113, and vice versa, as desired, which allows the processor cores 111 to operate on data stored in the faster cache 113 system. iMC 112 acts as a memory controller (M-Box), and functions as an interface between the RAM 130 and the caches 113 (e.g. via agent 115). For example, iMC 112 may translate read and write commands (e.g. from cores 111/agent 115) into specific memory commands, and schedule such commands based on memory timing to support communication between RAM 130 and the other components.

The CPU package 110 is configured to communicate with a plurality of other CPU packages 110, each with corresponding processor cores 111 and supporting components. Accordingly, the CPU packages 110 can operate together to apply a large number of cores 111 to execute applications and perform other processing tasks. The CPU packages 110 are interconnected via coherent fabric 114. The coherent fabric 114 is a CPU package 110 interconnect configured to communicate data between CPU packages 110 while maintaining data coherence between caches 113 located on separate CPU packages 110. For example, coherent fabric 114 may include a plurality of conductive traces for communication as well as a controller to maintain coherence. Accordingly, coherent fabric 114 communication supports cross package 110 application of a plurality of processor cores 111 to a common process. CPU package 110 may also contain additional communication fabrics as needed, for example a direct media interface (DMI), etc. By employing the coherent fabric 114 and cache coherence in cache 113, the related CPU packages 110 are part of a coherent domain 121. A coherent domain 121, as discussed herein, is a group of interconnected components that make consistent use of memory space. Accordingly, system 100 includes a plurality of processor cores 111 coupled in a coherent domain 121. A group of processor cores 111 in coherent domain 121 can operate by presuming that data stored in any shared location has not been modified by another process without notification.

The power management unit 116 acts a primary power management controller (W-Box) for the components of CPU package 110. For example, the power management unit 116 is configured to increase or throttle the electrical power applied to CPU package 110. Power changes may be selected to prevent overheating, place one or more cores 111 in turbo mode for high speed processing, and/or to react to other specified events. The power management unit 116 may also store specified system events related to power for reporting to other components.

The package 110 communicates with external components via IO fabric 118. IO fabric 118 includes a plurality of electrically conductive traces and may include one or more controllers to manage communications. In some embodiments, the package 110 employs IO fabric 118 to communicate with external components via a Peripheral Component Interconnect Express (PCIe) communication protocol. For example, package 110 may be positioned on a circuit board (e.g. motherboard) that includes a PCIe bus 140. PCIe bus 140 is a high speed serial computer expansion bus configured to communicate data between IO fabric 118 and a plurality of external devices. External devices may be any hardware devices positioned in a computing environment and configured to support computation by the processing cores 111. For example, external devices 143 may include external hard drives for long term storage, video processing cards, etc. Specifically, PCIe bus 140 may be employed to communicate with external devices such as a network interface controller (NIC) 145. NIC 145 is a network interface device employed to communicate data between system 100 to other devices over a network, such as a local area network (LAN), wide area network (WAN), data center network, cloud network, the Internet, etc. The NIC 145 may employ various networking protocols to communicate with remote devices, such as remote processor cores operating in other systems, such are remote servers. For example, source processor cores 111 in system 100 may communicate with remote processor cores operating in remote servers (e.g. a local VM on system 100 communicating with a remote VM/container operating on another server/data center).

The CPU package 110 also includes the network communications unit 120 coupled to at least one of the processor cores 111 and positioned in the coherent domain 121. The network communications unit 120 is a component that manages communication between the processor cores 111, local virtual entities, and/or remote devices/entities by employing network semantics. Processor cores 111 may communicate with each other by employing headers transmitted via network communications unit 120. The network communication unit 120 employs the packet headers to switch packets between processor cores 111 in the coherent domain 121 in a manner similar to network traffic. The network communications unit 120 receives headers and/or packets from a source processor core 111 destined for a destination processor core 111. The packets may contain addresses associated with the source/destination cores 111. As such, the network communications unit 120 receives communications from a source processor core 111 in the coherent domain 121 directed to a destination processor core 111 in the coherent domain 121. The communication includes a header containing a destination address associated with the destination processor core 111. The network communications unit 120 then employs the destination address to provide the destination processor core 111 access to data communicated from the source processor core 111. In some embodiments, the packets may contain data to be communicated, for example via a copy operation between memory locations. In some embodiments, the source processor core saves data to be communicated into shared memory, such as registers 119, cache 113, and/or RAM 130. Accordingly, the source processor 111 may transmit a pointer to the memory location of the data (e.g. instead of the data itself) to alleviate the need for intermediate storage of the data. In either case, the network communications unit 120 enforces communication policies on the communications based on the header information.

The network communications unit 120 also determines whether the communications should be considered local or remote. Local, as used herein, refers to components and/or communications maintained inside the coherent domain 121. Remote, as used herein, refers to components and/or communications outside of the coherent domain 121. Local communications can be managed using compressed headers with reduced information, which speeds communication processing time. Further, local communications can employ shorter address values as the coherent domain 121 necessarily includes a limited number of addressable processor cores 111 and/or virtual entities. While a compressed header may be used, the network communications unit 120 may provide similar services amounting to full compliance with the intended network semantics. The network communications unit 120 may also employ a policy look up to fetch and enforce a policy set by relevant management entity (e.g. SDN controller, infrastructure admin, and/or network admin for example). Such policy may be enforced before and/or after the forward action or receiving action. Such compressed headers and local address values can be mapped to full headers and global address values. The network communications unit 120 (and/or source processor cores 111) can employ such mappings to construct full headers and globally recognizable addresses when a packet is destined for a remote entity outside of the coherent domain 121. Accordingly, network semantics can be implemented in a manner that employs reduces processing overhead requirements when communicating in the coherent domain 121 while being transparent and applying policies and communication protocols in a manner that is understandable/predictable to entities outside of the coherent domain 121. Further, the network communications unit 120 can check for network semantics compliance when processing headers to ensure the processor cores 111 involved are capable of communicating via networking protocols.

As a specific example, the network communications unit 120 may rely on registers 119 to store policy data, routing data (e.g. addresses), remote/local mappings, etc. Registers 119 are dedicated memory locations that are quickly accessible for hardware specific functions. Registers 119 may include shared memory for data processing and/or specialized memory for use by the network communications unit 120. Upon receiving a header and/or packet, the network communications unit 120 verifies that the communication is network semantics compliant. For example, the network communications unit 120 can verify compliance by reading from a designated location in memory and/or IO space, reading from a designated register 119, reading from a flag in a header, etc. The network communications unit 120 then determines whether the communication is received from/destined for a local or remote processor core 111 based on address information in the communication header. If the communication is local in nature, the network communications unit 120 can employ local routing procedures, for example by employing local policy tables, local forwarding tables, reduced size addressing, etc. The network communications unit 120 can enforce policy as needed and indicate to the destination processing core 111 that new data is available, for example by employing an interrupt to indicate a pointer to shared memory holding the data to be communicated. Other mechanisms may also be used for indicating the location of the data to the destination processing core 111, such as polling, Inter-Process Communication (IPC) signaling, rendezvous signaling, setting a flag, setting a register 119 value, etc. As such, software layers aware of the presence and use of network communications unit 120, may use local semantics and save the cycles to create and process complete headers, thereby saving resources and time. If the communication is remote in nature, the network communications unit 120 can employ mappings to generate a network packet with globally understandable headers and addresses, enforce policy, and communicate the packet outside of the coherent domain 121, for example via NIC 145.

In system 100, the network communications unit 120 is positioned on the CPU package 110 containing at least one of the plurality of processor cores 111. As shown below, the network communications unit 120 may also be implemented in one or more of the processor cores 111 or as a separate circuit coupled to the coherent domain via the coherent fabric 114.

Figure 2:
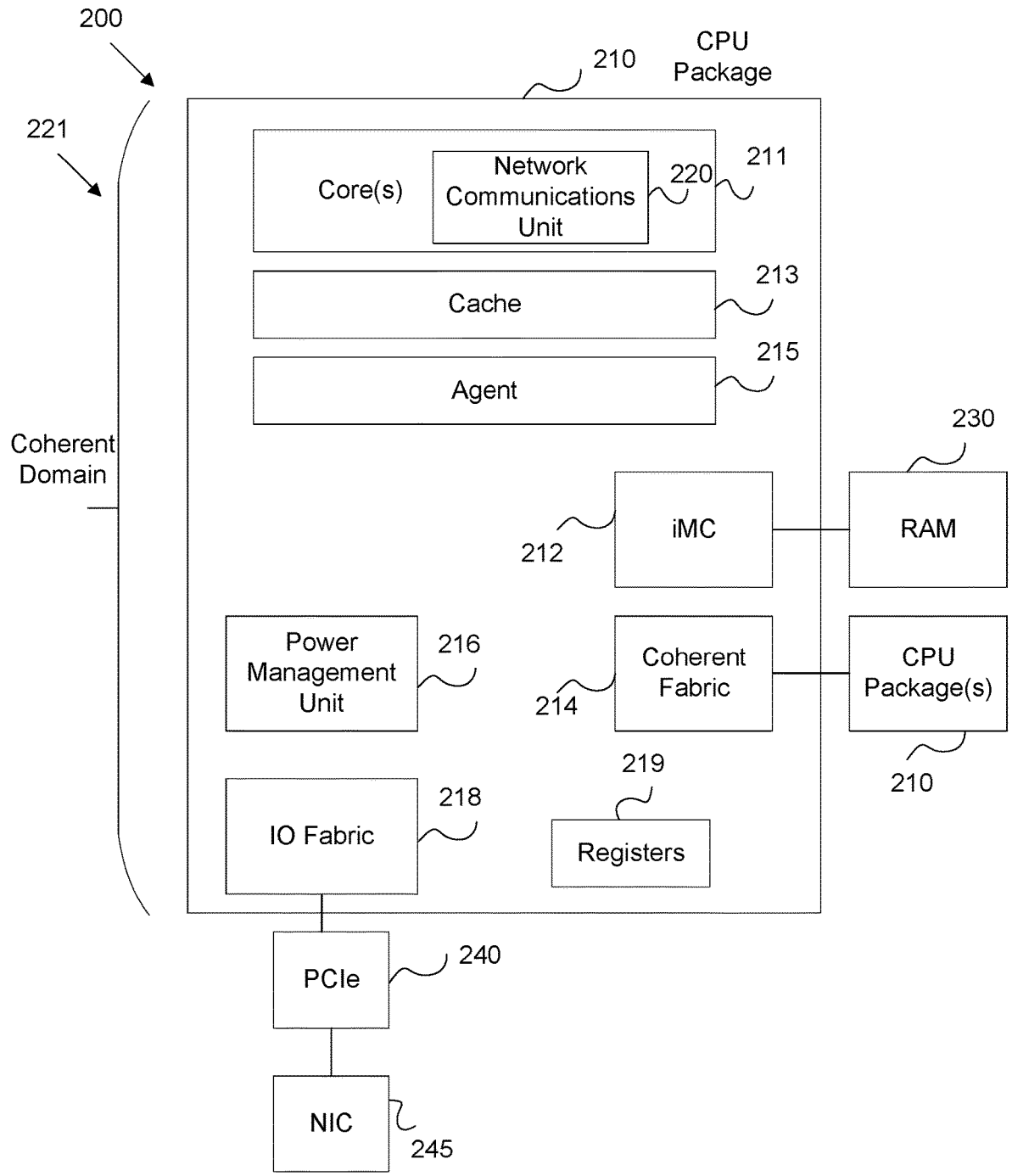
FIG. 2 is a block diagram of an embodiment of a multi-core CPU system including a network communications unit implemented in a processor core.

FIG. 2 is a block diagram of an embodiment of a multi-core CPU system 200 including a network communications unit 220 implemented in a processor core 211. System 200 includes a CPU package 210 including processor cores 211, cache 213, agent 215, iMC 212, coherent fabric 214, power management unit 216, IO fabric 218, and registers 219, which are substantially similar to CPU package 110, processor cores 111, cache 113, agent 115, iMC 112, coherent fabric 214, power management unit 116, IO fabric 118, and registers 119, respectively. The CPU package 210 is also coupled to RAM 230, PCIe 240, and NIC 245, which are substantially similar to RAM 130, PCIe 140, and NIC 145, respectively. CPU package 210 also includes a network communications unit 220 that is integrated into at least one of the plurality of processor cores 211. The network communications unit 220 is substantially similar to network communications unit 120, but is integrated into the processor cores 211 for faster switching speed. For example, a network communications unit 220 could be integrated into each processor core 211 or into a subset of the processor cores 211. Including the network communications unit 220 into the processor cores 211 may increase processing speed by placing the switching logic in close proximity to the processor cores 211. Such positioning may require design tradeoffs as positioning the network communications unit 220 in the processor cores 211 may reduce the amount of space for general purpose processing, executing instructions etc. System 200 includes a coherent domain 221, which is substantially similar to coherent domain 121. As the network communications unit 220 is located in the processor cores 221, the network communications unit 220 is also in the coherent domain 221.

Figure 3:
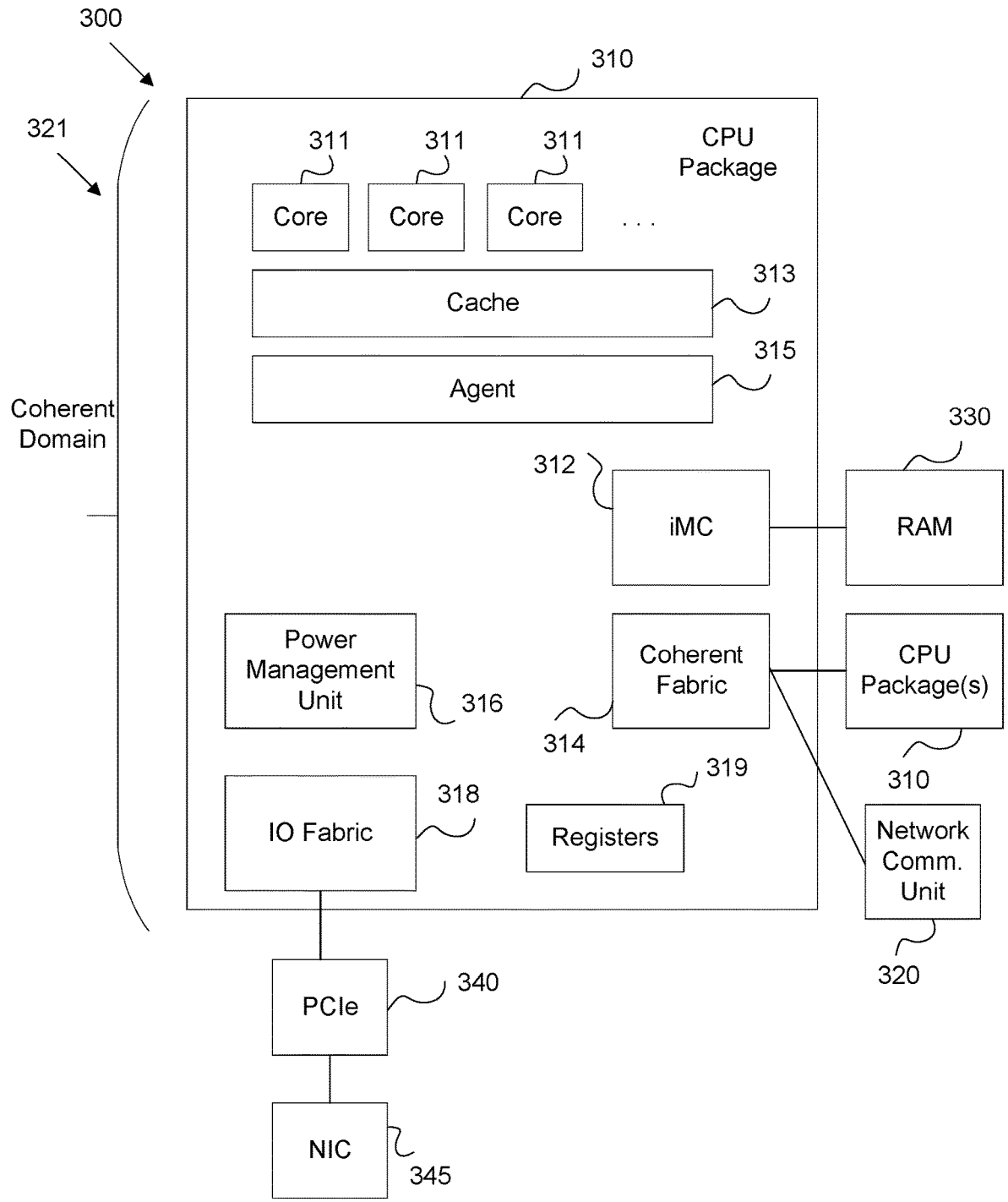
FIG. 3 is a block diagram of an embodiment of a multi-core CPU system including a network communications unit coupled to processor cores via a coherent fabric.

FIG. 3 is a block diagram of an embodiment of a multi-core CPU system 300 including a network communications unit 320 coupled to processor cores 311 via a coherent fabric 314. System 300 includes a CPU package 310 including processor cores 311, cache 313, agent 315, iMC 312, coherent fabric 314, power management unit 316, IO fabric 318, and registers 319, which are substantially similar to CPU package 110, processor cores 111, cache 113, agent 115, iMC 112, coherent fabric 114, power management unit 116, IO fabric 118, and registers 119, respectively. The CPU package 310 is also coupled to RAM 330, PCIe 340, and NIC 345, which are substantially similar to RAM 130, PCIe 140, and NIC 145, respectively. System 300 also includes a network communications unit 320. The network communications unit 320 is substantially similar network communications unit 120 but is coupled to at least one of the plurality of processor cores 311 via the coherent fabric 314. System 300 also includes a coherent domain 321, which is similar to coherent domain 121. As the network communications unit 320 is coupled via the coherent fabric 314, the network communications unit 320 is part of the coherent domain 321. Including the network communications unit 320 as a circuit outside of the CPU package 310 may allow for integration of network semantics into system 300 without expending space on the CPU package 310. Further, inclusion of the network communications unit 320 as a separate circuit outside the CPU package 310 may allow multiple CPU packages 310 to share a network communications unit 320. When the network communications unit 320 is implemented outside of the CPU package 310, the network communications unit 320 may include separate dedicated registers, which are substantially similar to registers 319, for storing policy, mapping, and forwarding information to support packet/header communication. Implementing the network communications unit 320 outside of the CPU package 310 may reduce switching speed with respect to systems 100 and 200. However, the network communications unit 320 can be implemented with fewer physical modifications to the other hardware components of system 300.

Figure 4:
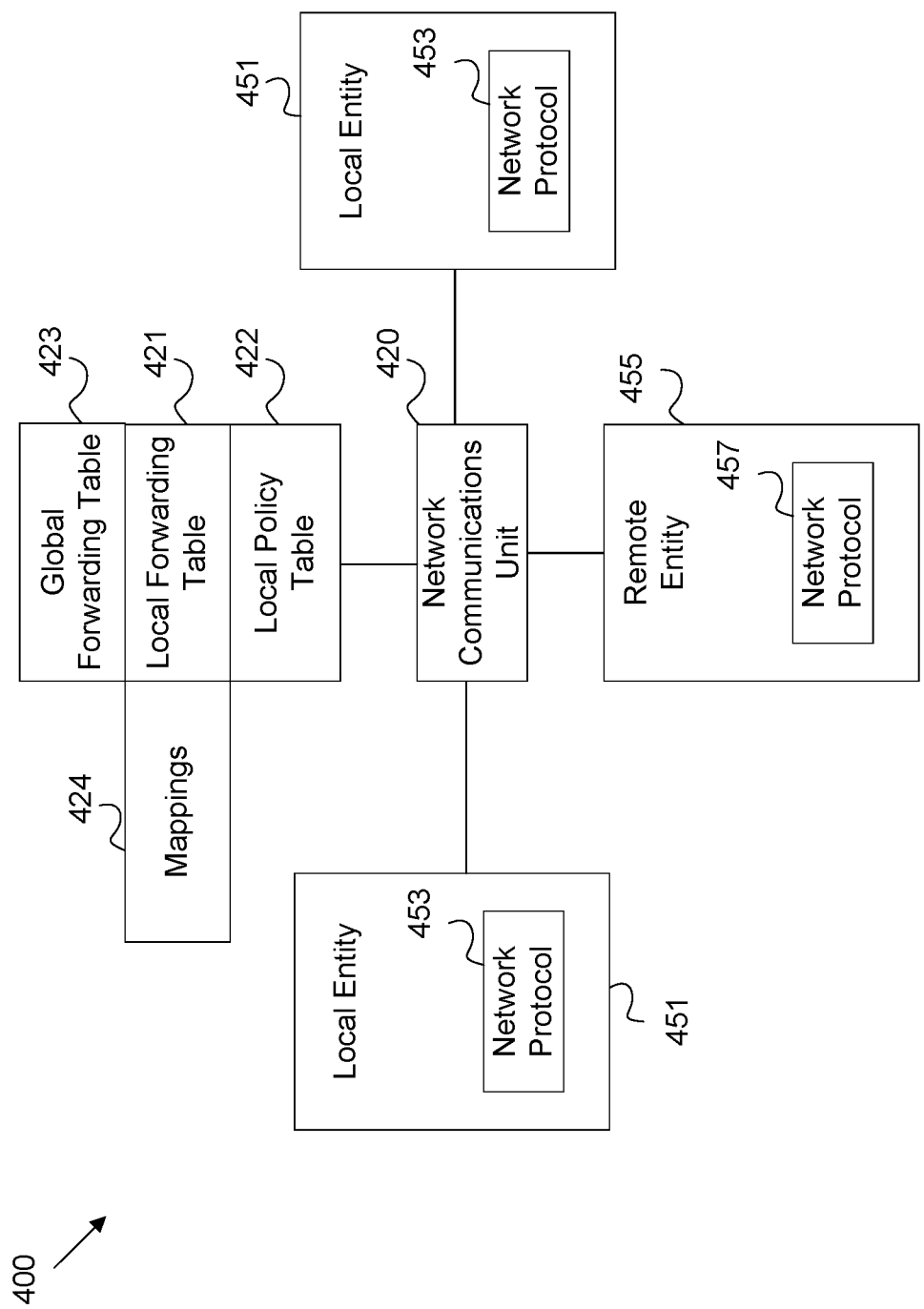
FIG. 4 is a block diagram of an embodiment of a system with a network communications unit to support communications between local entities and between local entities and remote entities.

FIG. 4 is a block diagram of an embodiment of a system 400 with a network communications unit 420 to support communications between local entities 451 and between local entities 451 and remote entities 455. System 400 includes local entities 451 operating inside the same coherent domain. For example, local entities may include "bare metal" components such as processor cores (e.g. processor cores 111, 211, and/or 311), virtual components such as containers and/or VMs operating on processor cores, or combinations thereof. As another example, local entities 451 may operate on the same CPU package, the same server, etc. The system 400 is also in communication with a remote entity 455. The remote entity 455 may also include "bare metal" components such as processor cores, virtual components such as containers and/or VMs, or combinations thereof. However, remote entity 455 may be positioned outside of the coherent domain. For example, remote entity 455 may be positioned in a different server and/or different data center than the local entities 451. Local entities 451 communicate via network protocols 453, which may be any network protocol, such as Transmission Control Protocol (TCP), Media Access Control (MAC) switching, Internet Protocol (IP) routing, User Datagram Protocol (UDP), Virtual Extensible Local Area Network (VXLAN), VXLAN generic protocol extension (VXLAN-GPE), Network Virtualization using Generic Routing Encapsulation (NVGRE), Generic Routing Encapsulation (GRE), Stateless Transport Tunneling (STT), Session Initiation Protocol (SIP), Stream Control Transmission Protocol (SCTP), etc. Remote entity 455 communicates via network protocols 457, which may be the same or different protocols from network protocols 453.

System 400 includes a network communication unit 420, which may be substantially similar to network communication units 120, 220, and/or 320. Network communication unit 420 is positioned in the coherent domain and is hence a local entity. Network communication unit 420 has access to a local policy table 422, a local forwarding table 421, a global forwarding table 423, and/or mappings 424. Such tables/routing data may be stored in memory for use by the network communication unit 420 (e.g. in registers, RAM, cache, etc.) The local policy table 422 contains local rules governing communications between the entities 451 and/or 455. Such rules include security requirements (e.g. whether entities are allowed to exchange information or privacy protocols, which can be alleviated when the network communications unit provides the expected privacy service without actual encryption, for example), quality of service (QoS) requirements, bandwidth requirements, etc. The local forwarding table 421 contains information relevant to communications to and from local entities 451. The local forwarding table 421 may contain a reduced amount of forwarding data as the number of local entities 451 in a coherent domain is likely to be small (e.g. less than 100). The local forwarding table 421 may also address local entities by using a local addressing scheme that employs fewer bits than a global addressing scheme. Further, the local forwarding table 421 may contain only enough information to determine how to switch a packet from a source to a destination. The global forwarding table 423 may contain any routing information desired to support network protocols 453 and/or 457. The mappings 424 contain correlations between local addresses recognizable in the coherent domain and global addresses recognizable outside the coherent domain.

When a local entity 451 wishes to communicate with another local entity 451, the local entity 451 generates a message/header by employing network protocol 453 and forwards the message and/or header to the network communications unit 420. The header may indicate source/destination addresses for the message. When the data is to be transmitted within the coherent domain, the data to be transmitted can be stored in shared memory, and a pointer may be included with the header. Alternatively, a dedicated location in memory (e.g. specific queue), may be dedicated/reserved to the network communication between two local entities or a local and remote entity. The network communications unit may determine the desired service and policy based on that location thereby eliminating the need for the sender to produce any header. The network communications unit may, if appropriate, maintain a local state e.g. mutable data (e.g. TCP sequence) for the case a local entity is migrated and then needs to conform to standardized remote protocols. In some embodiments, the data may be encoded with the header in packet format. When the network communications unit 420 receives the header/message, the network communications unit 420 may first determine network semantics compliance (e.g. prior to providing the destination entity access to the data). Network semantics compliance may be indicated by a corresponding flag in the header. If the entity is not network semantics compliant, the message should be treated via processor interrupts. Presuming network semantics compliance, the network communications unit 420 employs the source/destination addresses in the header to query the policy table to determine local rules governing communications between the source local entity 451 and the destination local entity. The network communications unit 420 then enforces the rules from the policy table when providing the destination local entity 451 access to the data from the source network entity 451. As such, the network communications unit 420 can maintain isolation between entities, enforce security, manage inter-operability between entities, etc. The network communications unit 420 further queries the local forwarding table 421 to determine how to switch the message to the destination local entity 451. As the local policy table 422 and the local forwarding table 421 contain relatively small address sizes and relatively little forwarding data, querying the local policy table and local forwarding table 421 can be accomplished much more quickly than the global forwarding table. Further efficiency increasing mechanisms can be applied to the local tables 421-422 in a manner that is transparent from outside the coherent domain.

Once the destination is determined, the network communication unit 420 can provide the destination local entity 451 access to the data communicated from the source local entity. For example, the network communication unit 420 can copy the data into shared memory and notify the destination network entity of a location of the data in shared memory, for example by employing an interrupt with a pointer to the data in shared memory. As another example, the source local entity 451 can manage data storage and the network communication unit 420 can inform the proper destination entity 451 of the location of the data. Such an embodiment may be useful when both the source and destination local entities 451 operate on the same CPU package. As another example, the network communication unit 420 can provide the destination local entity access to the data communicated from the source local entity 451 by transmitting the data to the destination local entity, for example via the coherent fabric with the data encoded in packet format. Such an embodiment may be useful when the source and destination local entities 451 operate in the same coherent domain and on different CPU packages.

When a local entity 451 wishes to communicate with a remote entity 455, the local entity 451 generates a message/header by employing network protocol 453 and forwards the message and/or header to the network communications unit 420. The network communication entity 420 may verify network semantics. The network communication entity 420 may also determine that the destination entity is a remote entity 455 outside the coherent domain. Such determination may be based on a flag in the header or based on information in the local forwarding table 421 and/or local policy table 422. A trusted entity, such as the hypervisor may set the flag denoting locality of a destination. This may be done for the first communication and/or a mechanism may enable the sender to query the locality and thereby by pass the requirement for providing the whole header set. Much like policy, information indicating destination location as local or remote can be communicated to the sender out of band and in advance data plane communications. The network communication entity 420 may enforce policy on the communication. The network communication entity 420 may also query the global forwarding table 423 to determine how to route the packet to the remote entity 455. For example, the network communication entity 420 may perform any conversions desired from network protocol 453 to network protocol 457. The network communication entity 420 may also convert address from the local address space to the global address space by employing mappings 424. The network communication entity 420 may then forward the data to the remote entity 455, for example by employing a NIC and an intervening non-coherent network, for example to communication with a remote entity 455 in a common or a different data center via network protocol 457. In the event the remote entity 455 replies, the network communication entity 420 may perform the process in reverse. For example, the network communication entity 420 may convert from global addressing to local addressing and from network protocol 457 to network protocol 453 by employing global forwarding table 423, mappings 424, local forwarding table 421, and local policy table 422. The network communication entity 420 may forward the data to the destination local entity 451 by providing the converted packet directly to the local entity 451 or storing the data into shared memory and forwarding a pointer to the data via an interrupt.

As shown above, the system 400 may employ a plurality of local and/re remote entities 451 and 455 (e.g. local/remote processor cores, VMs, containers, etc.) where the entities are associated with local addresses and remote addresses. The local addresses are mapped to the remote addresses via mappings 424. The local addresses may be shorter than the remote addresses to support increased switching speed. The local addresses may be employed for communications by the network communications unit 420 in the coherent domain and the remote addresses may be employed by the network communications unit 420 for communications with entities outside the coherent domain.

Figure 5:
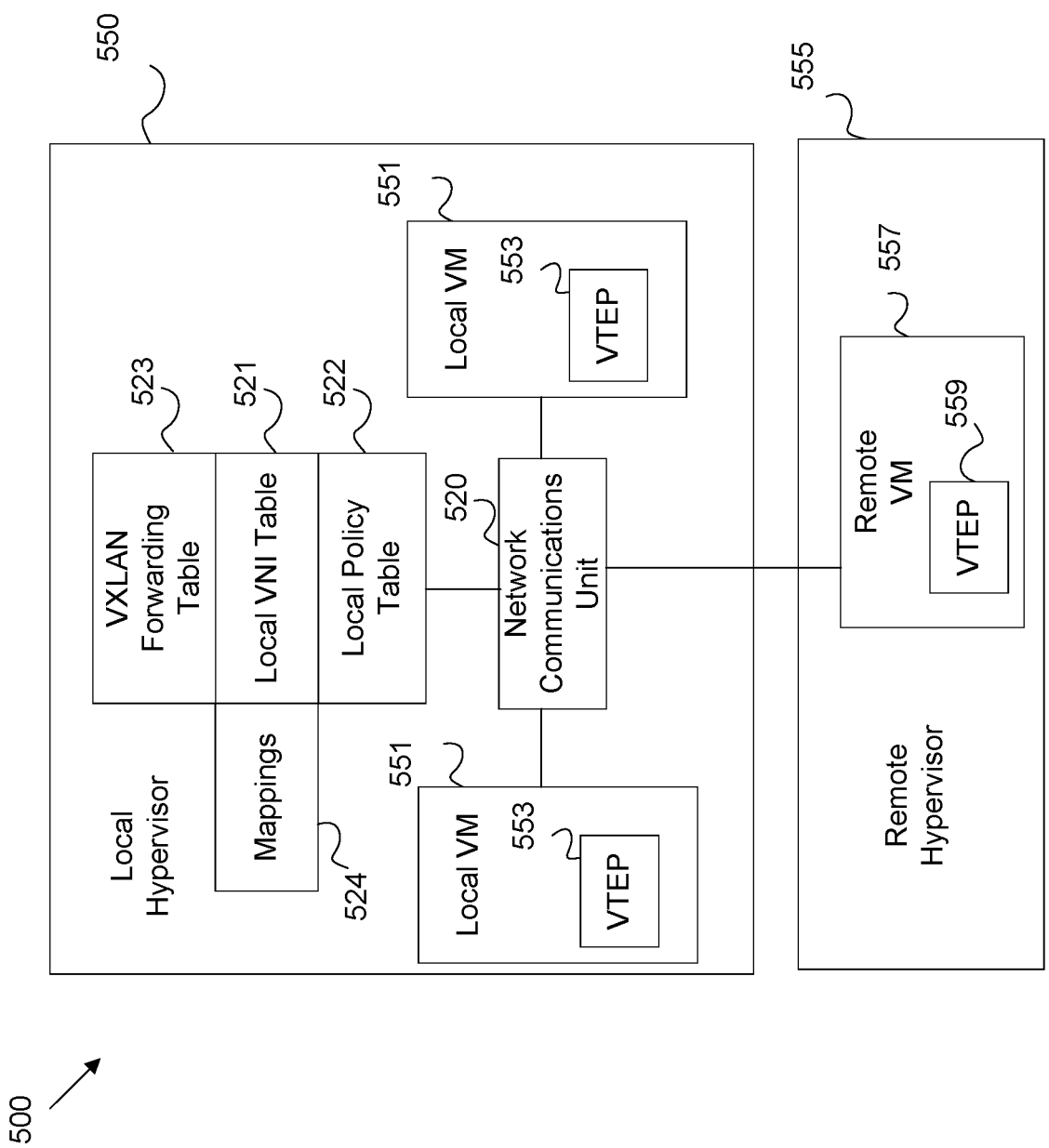
FIG. 5 is a block diagram of an embodiment of a system with a network communications unit to support communications between local Virtual Machines (VMs) and between local VMs and remote VMs.

FIG. 5 is a block diagram of an embodiment of a system 500 with a network communications unit 520 to support communications between local Virtual Machines (VMs) 551 and between local VMs 551 and remote VMs 557. System 500 may be a specific implementation of system 400. System 500 includes a network communications unit 520, which is substantially similar to network communications unit 420. System 500 also includes local VMs 551, which operate as local entities, such as local entities 451. Local VMs 551 are emulated machines that operate in the same coherent domain, and hence may operate on the same processor core, on processor cores on the same CPU package, and/or on processor cores on different CPU packages coupled via a coherent fabric. Local VMs 551 may operate on the same local hypervisor 550. A hypervisor is operating entity that creates, operates, and manages VMs by executing instructions on one or more processor cores.

System 500 is also coupled to a remote VM 557 operating on a remote hypervisor 555, which may be similar to local VMs 551 and local hypervisor 550 but may operate outside of the coherent domain in the local hypervisor 550. For example, remote hypervisor 555 and remote VM 557 may operate on a separate physical server, network, and/or data center than the local hypervisor 550 and the local VM 551. The local VMs 551 and the remote VM 557 may employ VXLAN protocols to communicate. VXLAN is a routing protocol that employs tunneling to span one or more networks, such as an IP network. VXLAN employs virtual tunnel end points (VTEP) at each end of the tunnels, which in many cases is implemented as part of a virtual switch (vSwitch) (e.g. Open vSwitch (OvS)). For example, the local vSwitch on behalf of its VMs 551 employ a VTEP 553 and the remote vSwitch on behalf of its VM 557 employs a VTEP 559. A VXLAN tag may be applied to packets traversing the VTEP 553/559. The VXLAN tag is used by the network to forward the packet to the destination VTEP (s). For example, the VXLAN tag may include a VXLAN network identifier (VNI) that uniquely identifies the VXLAN. A packet leaving a VTEP 553/559 is tunneled to the other VTEPs 553/559 sharing the same VNI and then broadcast to other locally connected nodes that are part of the same VXLAN according to layer two routing schemes.

In order to implement the VXLAN scheme, the network communications unit 520 may partially or fully take responsibility of the vSwitch for some of its tasks (e.g. VXLAN switching and forwarding and/or policy lookup and enforcement). The network communications unit 520 may employ a VXLAN forwarding table 523, a local VNI table 521, a local policy table 522, and mappings 524, which may be similar to global forwarding table 423, a local forwarding table 421, a local policy table 422, and mappings 424, respectively, but may be configured for use in connection with a VXLAN. For example, VXLAN forwarding table may contain VTEPs and VNIs for each VXLAN that the system 500 is aware of. The local VNI table 521 may contain VTEPs and VNIs for each VXLAN with a node inside the coherent domain. The local policy table 522 may contain communication rules for each VXLAN with a node inside the coherent domain. The local VNI table 521 and the local policy table may employ locally unique VNIs and VTEP addresses with a reduced number of bits for faster processing. Accordingly, mappings 524 may contain a mapping between local VNIs and VTEPs and globally unique VNIs and VTEPS stored in the VXLAN forwarding table 523.

When a local VM 551 determines to communicate with another local VM 551, the source local VM 551 sends a communication request to the local hypervisor 550. The local hypervisor 551 (and/or its vSwitch, which may be enclosed in the hypervisor) is aware that both VMs are local and hence may generate a header indicating the communication is local. The header may also indicate the source and destination VTEPs 553. The local hypervisor 550 may instruct the source local VM 551 to save the data to be communicated into shared memory. When the hypervisor/vSwitch/network communications unit gets the header, the local VM may have already posted the header in a memory location. Later that location can be made available to the receiving VM by address table manipulations without requiring the communicating entities involvement. Another option is that of shared memory. The local hypervisor 550 may then transmit the header to the network communications unit 520 along with a pointer to the location of the data to be communicated. Alternatively, the network communications unit 520 may be coupled to the communicating entities (e.g. via a doorbell or memory mapped Input/Output (IO), etc.) and may handle the header processing and policy lookup and enforcement without any further hypervisor involvement. The network communications unit 520 may check for network semantics compliance by reviewing the header. The network communications unit 520 may also check the local policy table 522 and enforce any policy rules relevant to the communication. The network communications unit 520 may also determine the destination VTEP 553 address based on the header VNI. The network communications unit 520 may then send the pointer to the destination local VM 551 via an interrupt sent to the processor core operating the destination local VM 551 corresponding to the VTEP 553 address. For example, the interrupt may be sent via the coherent fabric. Other schemes are also possible like New Application Program Interface (NAPI) or polling. It should be noted that the local and/or global VNI may be employed to dedicate particular resources for particular streams of communications between entities as desired.

As noted above, VXLAN may operate as a multicast protocol. As such, packets sent across the VXLAN may be sent to each node in the VXLAN that is a member of the specific VNI. In the event the remote VM 557 is also part of the same VXLAN as the local VMs 551, such information may also be contained in the local VNI table 521. In such a case, the remote VMs 557 VTEP 559 address is stored along with the VNI for the VXLAN in the local VNI table 521. When the network communications unit 520 determines that a remote VM 557 is a member of the VXLAN, the network communications unit 520 employs the mapping 521 to convert the received header into a full VXLAN packet (e.g. via packet encapsulation) with globally unique VXLAN address(es) based on the VXLAN forwarding table 523. The network communications unit 520 may then forward the packet to the remote VTEP 559 for delivery of the remote VM 557. For example, the packet may be sent across an IP network via a NIC.

When the remote VM 557 determines to communicates with the local VMs 551, the corresponding packet may be received by the network communications unit 520. The network communications unit 520 may check for compliance with network semantics. The network communications unit 520 may also employ the mappings 524 to convert the packet into a local addressing scheme (e.g. via de-capsulation) and store the data into memory. The network communications unit 520 may also enforce policy for the communication based on the local policy table 522. Further, the network communications unit 520 may employ the local VNI table to determine the corresponding VTEPs 553 and communicate with the local VMs 551 by sending interrupts to their corresponding processors with pointers to the communicated data. Accordingly, the data can be shared with each local VM 551 directly from shared memory without having to make multiple copies of the packet for each local VMs 551 use.

As such, when a network communications unit 520 is communicating between source entities and destination entities, a destination processor core may operate a destination VM. In such a case, the destination address associated with the destination processor core may be a VTEP of the destination VM. Further, in such a case the destination processor core is associated with a global VNI associated with the VXLAN. The global VNI is mapped to a local VNI by mappings 524 for communications in the coherent domain.

Figure 6:
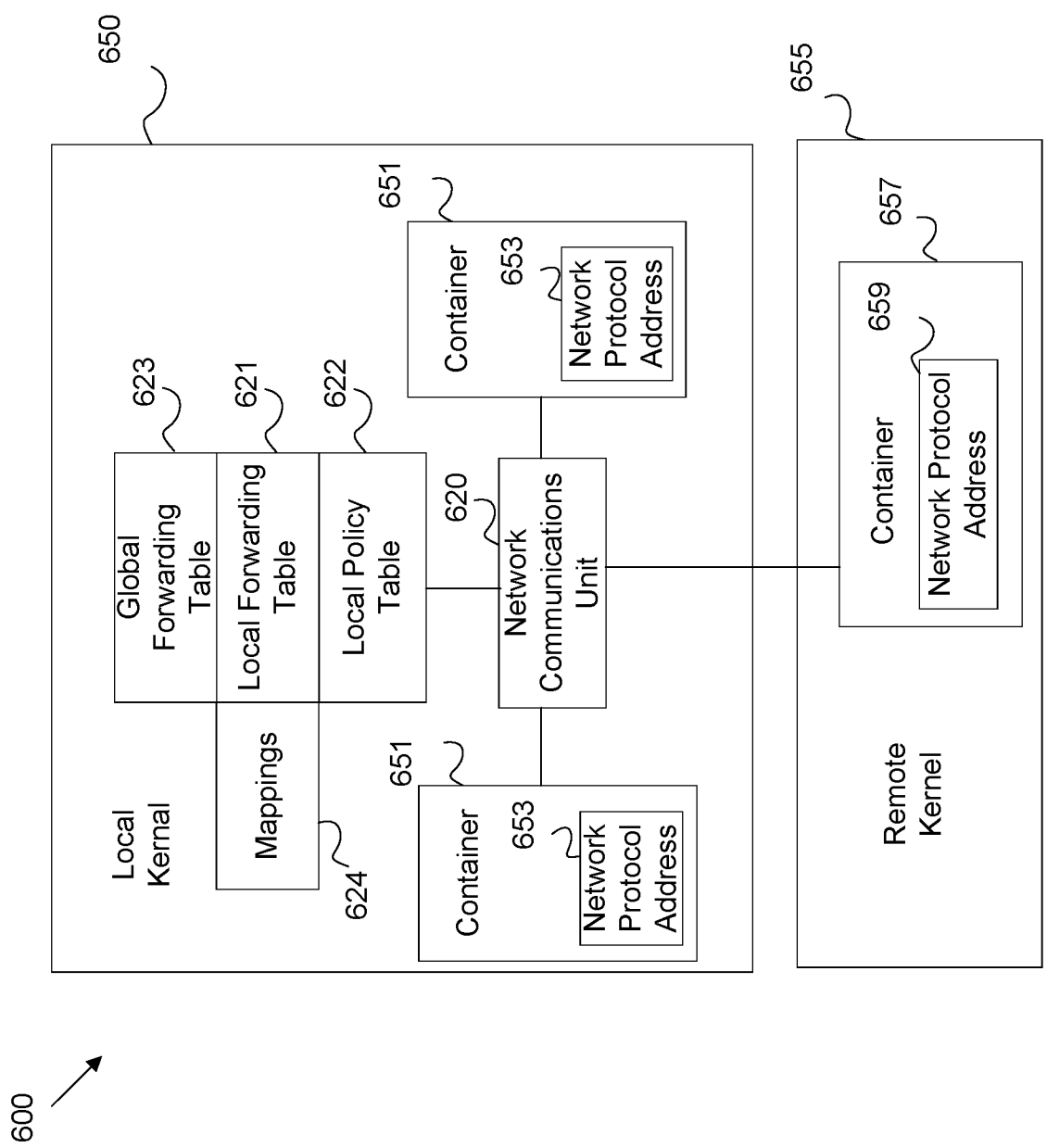
FIG. 6 is a block diagram of an embodiment of a system with a network communications unit to support communications between local docker containers and between local containers and remote containers.

FIG. 6 is a block diagram of an embodiment of system 600 with a network communications unit 620 to support communications between local docker containers 651 and between local containers 651 and remote containers 655. Network communications unit 620 may be substantially similar to network communications unit 420, and may be configured to communicate between docker containers. Network communications unit 620 may perform packet routing by employing global forwarding table 623, local forwarding table 621, local policy table 622, and mappings 624, which are substantially similar to global forwarding table 423, local forwarding table 421, local policy table 422, and mappings 424, respectively. Local processor cores may execute instructions to operate a local kernel 650. A kernel is an operating entity that creates, operates, and manages containers by executing instructions on one or more processor cores. Accordingly, the local kernel 650 operates local containers 651. Further, a remote kernel 655 in another server, network, and/or data center may operate a remote container 659 in a similar manner. Containers 651 and 657 may communicate via multiple network protocols (e.g. layer two switching, layer three routing, etc.). As such, local containers 651 and remote container 659 each have network protocol addresses 653 and 659, respectively. Such network protocol addresses 653 and 659 are assigned in an appropriate manner for the corresponding network communication protocols employed.

Network communications unit 620 routes data between local containers 651 and/or remote containers 657 in a manner similar to routing schemes discussed above. For example, a local container 651 communicating with another local container 651 sends a request to the local kernel to generate a packet. The local kernel 650 (and/or the relevant driver) is aware that both containers 651 are local and hence generates a header indicating the communication is local in nature. The header is send to network communications unit 620 along with a pointer to the memory location for the data to be communicated. The network communications unit 620 determines network semantics compliance from the header. The network communications unit 620 further determines the destination network protocol address 653 from the header. The network communications unit 620 then enforces policy rules based on a query of local policy table 622. The network communications unit 620 then consults the local forwarding table 621 for routing instructions and then sends a pointer to the processor operating the destination local container 651 via an interrupt.

As another example, a local container 651 communicating with a remote container 657 sends a request to the local kernel 650 to generate a packet. The local kernel 650 is aware that remote container 657 is not local and hence generates a full data packet with globally unique addresses indicating the source container network protocol address 653 and the destination container network protocol address 659. The packet is then forwarded to the network communications unit 620. The network communications unit 620 determines network semantics compliance from the header as desired. The network communications unit 620 further determines the destination network protocol address 653 from the header and determines the packet is not local. The network communications unit 620 enforces policy rules based on a query of local policy table 622. The network communications unit 620 then forwards the packet according to instructions in the global forwarding table 623.

As another example, when a packet is received at the network communications unit 620 from the network protocol address 659 of the remote container 657, the network communications unit 620 may transparently convert the packet into a local format packet by employing mappings 624 and forwarding according to the local forwarding table 621 and local policy table 622 as discussed above.

As such, when a network communications unit 620 is communicating between source entities and destination entities, a destination processor core may operate a docker container. In such a case, a destination address associated with the destination processor core as communicated by the network communications unit 620 may be a local address mapped to a global network protocol address of the docker container.

Figure 7:
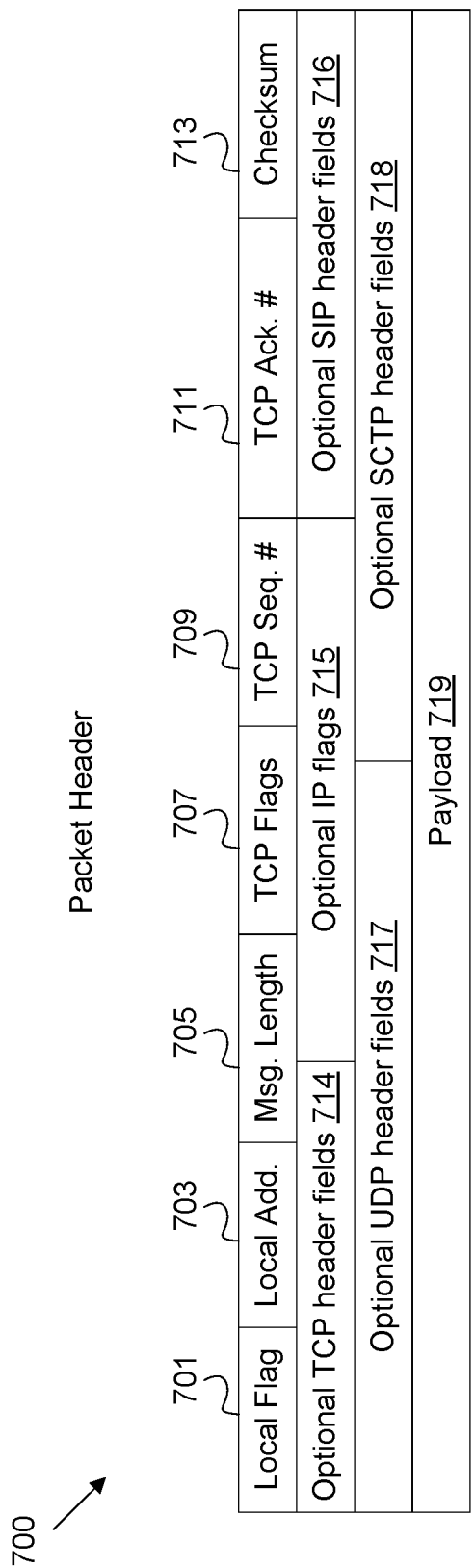
FIG. 7 illustrates an example header for use in communication between processor cores via a network communications unit.

FIG. 7 illustrates an example header 700 for use in communication between processor cores and/or network entities via a network communications unit, such as network communication entity 120, 220, 320, 420, 520, and/or 620. The header 700 may contain a local flag 701 that may be set to indicate the communication is between entities in the same coherent domain or not set to indicate the communication traverses outside of a coherent domain, or vice versa. The header may also comprise a local address field 703 containing locally unique addresses of the source and/or destination entity (e.g. IP addresses, MAC addresses, VNIs, tags, etc.) The header 700 may also contain a message length field 705 that communicates the total number of bits in the packet and/or header. The header 700 may also contain TCP flags 707 indicating connection related information regarding the packet. The header 700 may also contain a TCP sequence number field 709 containing information indicating packet order to allow the receiver to properly arrange out of order packets. The header 700 may also contain a TCP acknowledge field 711 indicating the sequence number of the next packet to be sent. The header 700 may also contain a checksum field 713 including a checksum value that can be employed by the receiver to check for communication errors. Depending on the protocol used by the sending and/or receiving entity, the header 700 may also contain optional TCP header fields 714 including TCP data to support a TCP connection. When the protocol used is an IP layer three routing protocol, optional IP flags 715 may be included to support corresponding routing protocols. When the protocol used is a SIP protocol, optional SIP header fields 716 may be included to support SIP connections. When the protocol used is a UDP protocol, optional UDP header fields 717 may be included to support UDP connectionless communications. When the protocol used is a SCTP protocol, optional SCTP header fields 718 may be included to support SCTP communications. Header 700 may also include other fields as desired to implement VXLAN-GPE, NVGRE, GRE, STT, etc. A payload 719 may also be attached to header 700. The payload 719 may include the data to be communicated and/or a pointer to the location of the data to be communicated in memory. When communicating the header 700 in the coherent domain, the fields of header 700 may be generated and stored. A compressed header can then be communicated to the network communications unit. The compressed header may only contain the information necessary to route/switch the data across the coherent domain. For example, policy may define certain fields that would typically be carried in a header. Such fields may therefore be omitted when communicating locally. Other information may be transmitted out of band allowing further header compression. The full header 700 can then be recreated and/or recalled from memory in the event the packet should be communicated outside of the coherent domain. Accordingly, any communication optimizations enacted inside the coherent domain are transparent outside of the coherent domain. As such, the entities not sharing a coherent domain can interact without needing an understanding of each other's internal routing protocols and/or system architectures.

Figure 8:
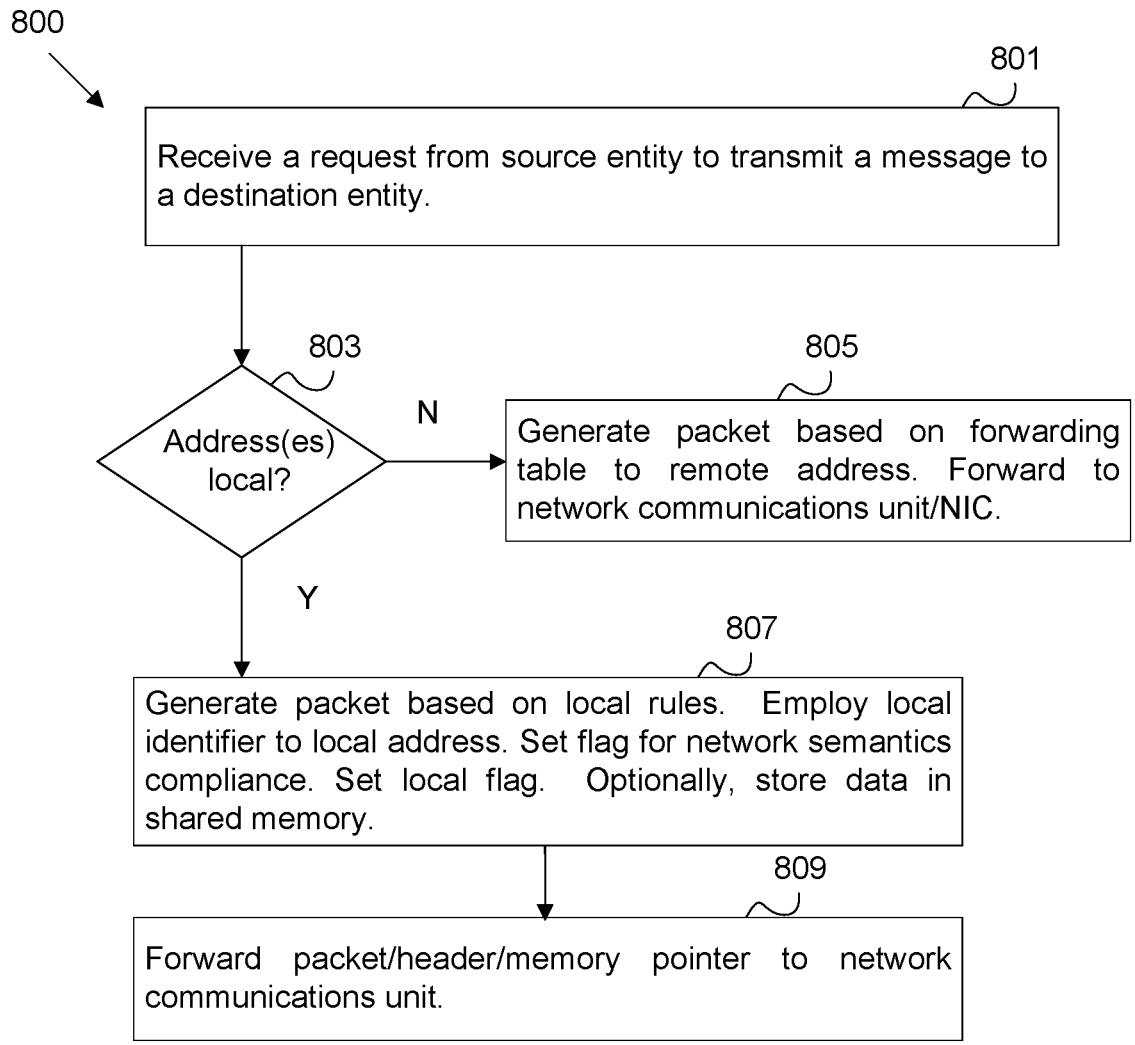
FIG. 8 is a flow chart of an embodiment of a method for network semantics based processor communication by an operating system entity.

FIG. 8 is a flow chart of an embodiment of a method 800 for network semantics based processor communication by an operating system entity, such as local entity 451, a local hypervisor 550, and/or a local kernel 650. At block 801, a request is received at the operating system entity. The request may be a request from a source entity to transmit data to a destination entity. At block 803, the operating system entity may determine whether the source and/or destination addresses are local to the operating system entity. Hence, the operating system entity may determine whether the source entity and the destination entity operate in a common coherent domain at block 803. When the address (es) are not local (e.g. the destination address), the method 800 proceeds to block 805. At block 805, the operating system entity generates a packet based on a forwarding table to a remote address outside of the coherent domain. The packet can then be sent to a network communications unit for communication outside the coherent domain for example via a NIC.

When the address(es) are both local at block 803, the method 800 proceeds to block 807. At block 807, the operating system entity generates a communication, such as a packet, to the destination entity based on local rules (e.g. local addressing schemes, etc.) The communication contains a destination address associated with the destination entity. The operating system entity may employ local identifiers to the local destination address. The local identifiers may map to global identifiers to communication outside of the coherent domain as desired. The operating system entity may set a network semantics flag in the header to indicate to the network communications unit that the communication is between network entities (e.g. processor cores, VMs, containers, etc.) that are compliant with network semantics. The operating system entity may also set a local flag in the header to indicate to the network communications unit that the communication is local to the coherent domain. Optionally, the data may be stored in memory shared by a source processor operating the source entity and a destination processor operating the destination entity. At block 809 the packet, header, and/or a memory pointer is forwarded to the network communications unit to provide access to the data at the destination entity. For example, when the data to be communicated is stored in shared memory, the pointer to the stored data in shared memory may be forwarded instead of the data itself. As another example, the data can be appended to the header and both the data and header can be forwarded to the network communications unit. As shown above, method 800 is applicable to network 400, for example when the source/destination are processor cores. The method 800 is also applicable to network 500 when the operating system entity is a hypervisor, and at least one of the source entity or destination entity is a VM. The method 800 is also applicable to network 600 when the operating system entity is a kernel, and at least one of the source entity or destination entity is a docker container. It should be noted that the network communication unit can serve a role in header generation, policy lookup and application, and data movement, and should not be limited any single aspect.

Figure 9:
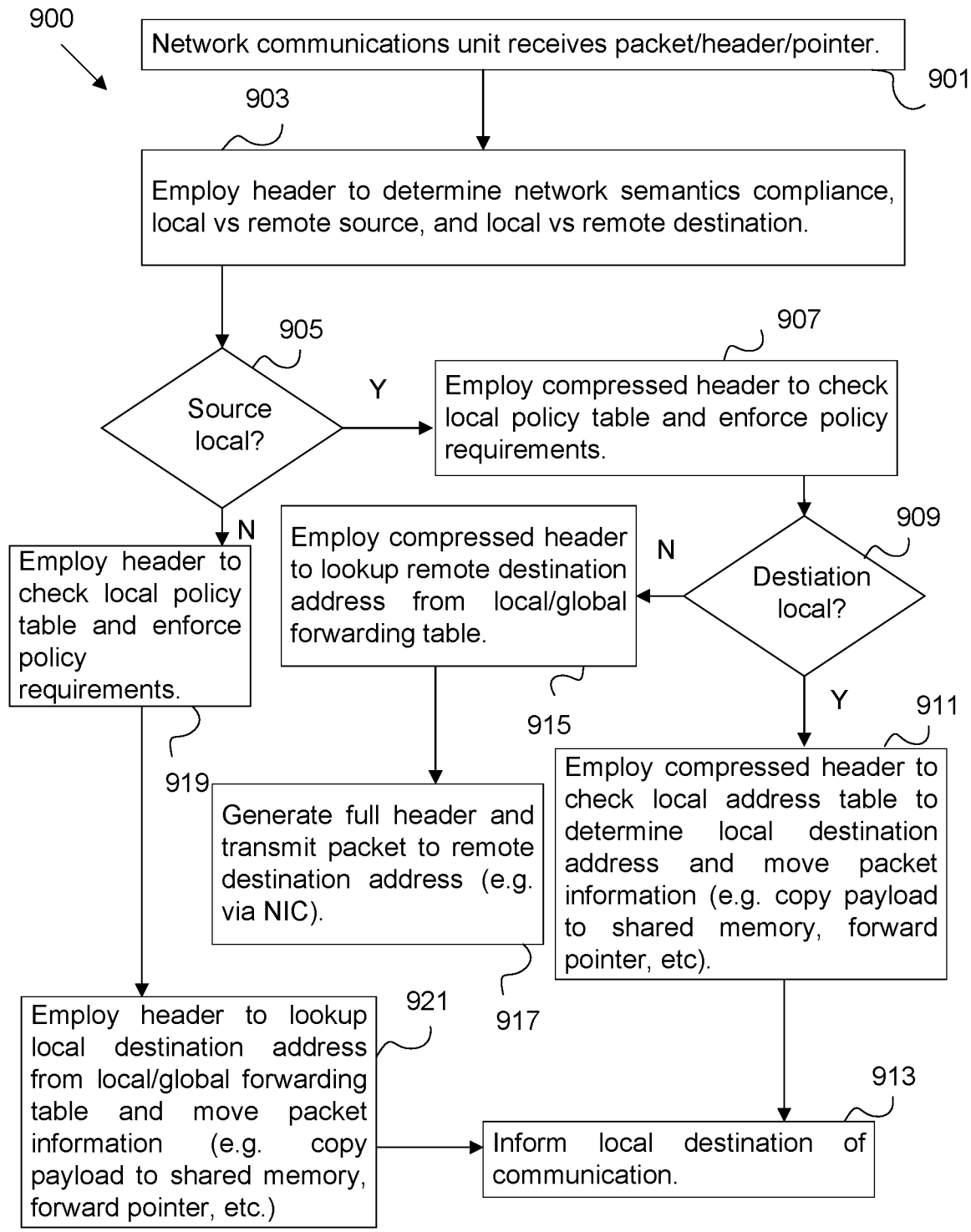
FIG. 9 is a flow chart of an embodiment of a method for network semantics based processor communication by a network communications unit.

FIG. 9 is a flow chart of an embodiment of a method 900 for network semantics based processor communication by a network communications unit, such as network communications unit 120, 220, 320, 420, 520, and/or 620. The method 900 begins at block 901 when the network communications unit receives a packet, a header, and/or a pointer from a source processor core/entity, for example as a result of method 800. The packet, a header, and/or a pointer may all be generally referred to as a communication. At block 903, the network communications unit may employ the header to determine network semantics compliance (e.g. prior to providing the destination processor core/entity access to the data). Further, the communication may include a header containing a source address associated with the source processor core/entity and the destination address associated with the destination processor core/entity. Accordingly, the network communications unit may employ the header to determine whether the source and/or destination addresses are local to the coherent domain or remote (e.g. outside the coherent domain.) At block 905, the method 900 proceeds to block 907 if the source is local and block 919 if the source is not local.

At block 907, the source is local and hence the header may be compressed by employing simplified local addressing and/or a reduced complexity header (e.g. compressed header). The compressed header is employed to query a policy table to determine rules governing communications between the source processor core/entity and the destination processor core/entity. Further, the rules from the policy table are enforced, for example when providing the destination processor core/entity access to the data from the source processor core/entity. It should be noted that when this packet is the first packet of a new flow between source and destination, the policy may be checked first and then the compressed header may be applied. For subsequent packets the local policy may be pointed to by the local header, so the local header may be applied first. At block 909, the method 900 proceeds to block 911 if the destination is local and block 915 if the destination is not local.

At block 911, both the source processor core/entity and the destination processor core/entity are local and hence in the same coherent domain. As such, the network communications unit may employ local rules to communicate the data from the source to eth destination. For example, the network communications unit may employ the compressed header to check local address table to determine local destination address. The network communications unit may employ the destination address to provide the destination processor core/entity access to data communicated from the source processor core/entity. For example, the network communications unit may move the packet information by copying the payload to shared memory (or to a memory dedicated to the receiving entity) and forwarding pointer, forwarding a pointer received as part of the packet payload, etc. The method 900 may then proceed to block 913 and inform the local destination of the communication. For example, the network communications unit may provide the destination processor core/entity access to data communicated from the source processor core/entity by notifying the destination processor/entity of a location of the data in shared memory via a pointer sent in an interrupt or doorbell etc.

Returning to block 915, when the source is local, but the destination is not, the network communications unit may employ the compressed header to lookup the remote destination address directly from a global forwarding table. As another example, the network communications unit may look up the remote destination address in the local forwarding table and employ mappings to convert addressing schemes prior to reviewing the global forwarding table. Upon determining the address and other communication information for remote transmission, the method 900 proceeds to block 917. At block 917, a full header may be generated for the packet by employing fields appropriate for the destination address protocol and globally recognizable addresses. The packet with the header and data to be communicated can then be transmitted to the remote processor core/entity at the remote destination address, for example by forwarding the packet via a NIC.

Returning to block 919, the method 900 reaches block 919 when the source is not local to the coherent domain. As the network communications unit is configured to handle local traffic (e.g. not to act as an intermediate node) the received packet can be assumed to be from a remote source to a local destination. Hence the packet may include a full header with globally recognizable addresses. At block 919, the header is employed to check local policy table (and/or any global policy table). Any rules returned for the communication can then be enforced as policy requirements. At block 921, the network communications unit may employ the header to lookup a local destination address for the destination processor core/entity. For example, network communications unit may obtain relevant information from the local forwarding table, the global forwarding table, or combinations thereof. The network communications unit may then provide the destination processor core/entity access to the data in the packet by moving the packet information, for example by copying payload to shared memory and forwarding a pointer to the processor/entity at the destination address. The method 900 then proceeds to block 913 and informs the local destination of the communication by employing a processor interrupt.

As shown above, method 900 is applicable to network 400, for example when the source/destination are processor cores. The method 900 is also applicable to network 500 when at least one of the source entity or destination entity is a VM. The method 900 is also applicable to network 600 when at least one of the source entity or destination entity is a docker container or any other type of container, such as Linux Containers (LXC), Rocket containers, or other entities equipped to communicate. Further, as discussed above, the method 900 may employ both local and remote (e.g. global) addressing schemes. For example, the source processor core/entity and destination processor core/entity may be associated with local addresses and remote addresses. The local addresses may be mapped to the remote addresses. Further, the local addresses may be shorter than the remote addresses for increased communication speed. The local addresses may be employed for communications by the network communications unit in the coherent domain. The remote addresses may be employed by the network communications unit for communications with entities outside the coherent domain. It should be noted that the mechanisms described herein can scale beyond a single physical socket (e.g. across physical interfaces/local buses connecting two or more sockets on a server board).

Examples

Illustrative examples of the technologies disclosed herein are provided below. An embodiment of the technologies may include any one or more, and any combination of, the examples described below.

Example 1 includes an apparatus comprising: a plurality of processor cores coupled in a coherent domain; and a network communications unit coupled to at least one of the processor cores and located in the coherent domain, the network communications unit to: receive a communication from a source processor core in the coherent domain destined for a destination processor core in the coherent domain, the communication including a header containing a destination address associated with the destination processor core, and employ the destination address to provide the destination processor core access to data communicated from the source processor core.

Example 2 includes the subject matter of Example 1, and wherein the network communications unit is integrated into at least one of the plurality of processor cores.

Example 3 includes the subject matter of Example 1, and wherein the network communications unit is positioned on a CPU package containing at least one of the plurality of processor cores.

Example 4 includes the subject matter of Example 1, and wherein the network communications unit is coupled to at least one of the plurality of processor cores via a coherent fabric.

Example 5 includes the subject matter of Examples 1-4, and wherein providing the destination processor core access to data communicated from the source processor core includes notifying the destination processor of a location of the data in shared memory.

Example 6 includes the subject matter of Examples 1-4, and wherein providing the destination processor core access to data communicated from the source processor core includes transmitting the data to the destination processor core via the coherent fabric, the data encoded in packet format.

Example 7 includes the subject matter of Examples 1-6, and wherein the network communications unit is further to: employ the header to query a policy table to determine rules governing communications between the source processor core and the destination processor core, and enforce the rules from the policy table when providing the destination processor core access to the data from the source processor core.

Example 8 includes the subject matter of Examples 1-7, and wherein the destination processor core operates a destination VM, and the destination address associated with the destination processor core is a VTEP of the destination VM.

Example 9 includes the subject matter of Examples 1-8, and wherein the destination processor core is associated with a global VNI, and the global VNI is mapped to a local VNI for communications in the coherent domain.

Example 10 includes the subject matter of Examples 1-6, and wherein the destination processor core operates a container, and the destination address associated with the destination processor core is a local address mapped to a network protocol address of the container.

Example 11 includes the subject matter of Examples 1-10, and wherein the plurality of processor cores are associated with local addresses and remote addresses, wherein the local addresses are mapped to the remote addresses, wherein the local addresses are shorter than the remote addresses, wherein the local addresses are employed for communications by the network communications unit in the coherent domain and the remote addresses are employed by the network communications unit for communications with entities outside the coherent domain.

Example 12 includes the subject matter of Examples 1-11, and wherein the network communications unit is further to determine network semantics compliance prior to providing the destination processor core access to the data.

Example 13 includes a method comprising: receiving, at a network communications unit, a communication from a source processor core in a coherent domain to a destination processor core in the coherent domain, the communication including a header containing a destination address associated with the destination processor core, and employing the destination address to provide the destination processor core access to data communicated from the source processor core.

Example 14 includes the subject matter of Example 13, and further comprising employing the header to determine network semantics compliance prior to providing the destination processor core access to the data.

Example 15 includes the subject matter of Examples 13-14, and wherein the source processor core and destination processor core are associated with local addresses and remote addresses, wherein the local addresses are mapped to the remote addresses, wherein the local addresses are shorter than the remote addresses, wherein the local addresses are employed for communications by the network communications unit in the coherent domain and the remote addresses are employed by the network communications unit for communications with entities outside the coherent domain.

Example 16 includes the subject matter of Examples 13-15, and further comprising: employing the header to query a policy table to determine rules governing communications between the source processor core and the destination processor core, and enforcing the rules from the policy table when providing the destination processor core access to the data from the source processor core.

Example 17 includes the subject matter of Examples 13-16, and wherein the destination processor core operates a destination VM, and the destination address associated with the destination processor core is a VTEP of the destination VM.

Example 18 includes the subject matter of Examples 13-16, and wherein the destination processor core operates a container, and the destination address associated with the destination processor core is a network protocol address of the container.

Example 19 includes the subject matter of Examples 13-18, and wherein providing the destination processor core access to data communicated from the source processor core includes notifying the destination processor of a location of the data in shared memory.

Example 20 includes the subject matter of Examples 13-18, and wherein providing the destination processor core access to data communicated from the source processor core includes transmitting the data to the destination processor core via a coherent fabric, the data encoded in packet format.

Example 21 includes a method comprising: receiving, at an operating system entity, a request from a source entity to transmit data to a destination entity; determining that the source entity and the destination entity operate in a common coherent domain; generating a communication to the destination entity, the communication including a header containing a destination address associated with the destination entity; and forwarding the header to a network communications unit to provide access to the data.

Example 22 includes the subject matter of Example 20, and further comprising: storing the data in memory shared by a source processor operating the source entity and a destination processor operating the destination entity; and forwarding, to the network communications unit, a pointer to the stored data in the shared memory.

Example 23 includes the subject matter of Examples 20-22, and wherein the operating system entity is a kernel, and wherein at least one of the source entity or destination entity is a container.

Example 24 includes the subject matter of Examples 20-22, and wherein the operating system entity is a hypervisor, and wherein at least one of the source entity or destination entity is a VM.

Example 25 includes the subject matter of Examples 20-24, and further comprising setting a local flag in the header to indicate to the network communications unit that the communication is local to the coherent domain.

Example 26 includes the subject matter of Examples 20-25, and further comprising setting a network semantics flag in the header to indicate to the network communications unit that the communication is between processor cores and compliant with network semantics.

Example 27 includes an apparatus comprising: a plurality of processing means coupled in a coherent domain; and a network communications means positioned in the coherent domain, the network communications means to: receive a communication from a source processing means in the coherent domain to a destination processing means in the coherent domain, the communication including a header containing a destination address associated with the destination processing means, and employ the destination address to provide the destination processing means access to data communicated from the source processing means.

Example 27 includes the subject matter of Example 27, and wherein providing the destination processing means access to data communicated from the source processing means includes notifying the destination processing means of a location of the data in shared memory.

Example 29 includes the subject matter of Example 28, and wherein providing the destination processing means access to data communicated from the source processing means includes transmitting the data to the destination processing means via a coherent fabric, the data encoded in packet format.

Example 30 includes the subject matter of Examples 27-29, and wherein the network communications means is further to: employ the header to query a policy means to determine rules governing communications between the source processing means and the destination processing means, and enforce the rules from the policy means when providing the destination processing means access to the data from the source processing means.

Example 31 includes the subject matter of Examples 27-30, and wherein the destination processing means operates a destination VM, and the destination address associated with the destination processing means is a VTEP of the destination VM.

Example 32 includes the subject matter of Examples 27-31, and wherein the destination processing means is associated with a global VNI, and the global VNI is mapped to a local VNI for communications in the coherent domain.

Example 33 includes the subject matter of Examples 27-30, and wherein the destination processing means operates a container, and the destination address associated with the destination processing means is a local address mapped to a network protocol address of the container.

Example 34 includes the subject matter of Examples 27-33, and wherein the plurality of processing means are associated with local addresses and remote addresses, wherein the local addresses are mapped to the remote addresses, wherein the local addresses are shorter than the remote addresses, wherein the local addresses are employed for communications by the network communications means in the coherent domain and the remote addresses are employed by the network communications means for communications with entities outside the coherent domain.

Example 35 includes the subject matter of Examples 27-33, and wherein the network communications means is further to determine network semantics compliance prior to providing the destination processing means access to the data.

Example 36 includes an apparatus comprising a processor, the processor to operate an operating system entity to: receive a request from a source entity to transmit data to a destination entity; determine that the source entity and the destination entity operate in a common coherent domain; generate a communication to the destination entity, the communication including a header containing a destination address associated with the destination entity; and forward the header to a network communications unit to provide access to the data.

Example 36 includes the subject matter of Example 36, and wherein the operating system entity is further to: store the data in memory shared by a source processor operating the source entity and a destination processor operating the destination entity; and forward, to the network communications unit, a pointer to the stored data in the shared memory.

Example 38 includes the subject matter of Examples 36-37, and wherein the operating system entity is a kernel, and wherein at least one of the source entity or destination entity is a container.

Example 39 includes the subject matter of Examples 36-37, and wherein the operating system entity is a hypervisor, and wherein at least one of the source entity or destination entity is a VM.

Example 40 includes the subject matter of Examples 36-39, and wherein the operating system entity is further to set a local flag in the header to indicate to the network communications unit that the communication is local to the coherent domain.

Example 41 includes the subject matter of Examples 36-40, and wherein the operating system entity is further to set a network semantics flag in the header to indicate to the network communications unit that the communication is between processor cores and compliant with network semantics.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Although specific embodiments of the invention have been illustrated and described for purposes of illustration, it will be understood that various modifications may be made without departing from the spirit and scope of the invention. Accordingly, the invention should not be limited except as by the appended claims.

I claim:

1. An apparatus comprising:
a plurality of processor cores, at least two processor cores of the plurality of processor cores being coupled outside a coherent domain and at least two processor cores of the plurality of processor cores being coupled in the coherent domain, the coherent domain including multiple caches that store data in different locations such that each different location stores the same data and that maintains coherency of the data stored in the different locations such that a change to the data stored in a first location of the different locations results in a corresponding change to the data stored in a second location of the different locations, the plurality of processor cores being associated with local addresses and remote addresses, the local addresses being mapped to the remote addresses, the local addresses being employed for communication with the processor cores located in the coherent domain and the remote addresses being employed for communication with the processor cores located outside the coherent domain; and a network communications unit coupled to at least one of the processor cores and located in the coherent domain, the network communications unit to:

receive a communication from a source processor core in the coherent domain destined for a destination processor core in the coherent domain, the communication including a header containing a destination address associated with the destination processor core, and employ the destination address to identify a local address associated with the destination processor core to provide the destination processor core access to data communicated from the source processor core.

2. The apparatus of claim 1, wherein the network communications unit is integrated into at least one of the plurality of processor cores.

3. The apparatus of claim 1, wherein the network communications unit is positioned on a Central Processing Unit (CPU) package containing at least one of the plurality of processor cores.

4. The apparatus of claim 1, wherein the network communications unit is coupled to at least one of the plurality of processor cores via a coherent fabric.

5. The apparatus of claim 1, wherein providing the destination processor core access to data communicated from the source processor core includes notifying the destination processor core of a location of the data in shared memory.

6. The apparatus of claim 1, wherein providing the destination processor core access to data communicated from the source processor core includes transmitting the data to the destination processor core via a coherent fabric, the data encoded in packet format.

7. The apparatus of claim 1, wherein the network communications unit is further to:

employ the header to query a policy table to determine rules governing communications between the source processor core and the destination processor core, and enforce the rules from the policy table when providing the destination processor core access to the data from the source processor core.

8. The apparatus of claim 1, wherein the destination processor core operates a destination virtual machine (VM), and the destination address associated with the destination processor core is a virtual tunnel end point (VTEP) of the destination VM.

9. The apparatus of claim 8, wherein the destination processor core is associated with a global Virtual Extensible Local Area Network (VXLAN) Network Identifier (VNI), and the global VNI is mapped to a local Virtual Extensible Local Area Network (VXLAN) Network Identifier (VNI) for communications in the coherent domain.

10. The apparatus of claim 1, wherein the destination processor core operates a container, and the destination address associated with the destination processor core is a local address mapped to a network protocol address of the container.

11. The apparatus of claim 1, wherein the local addresses are shorter than the remote addresses.

12. The apparatus of claim 1, wherein the network communications unit is further to determine network semantics compliance prior to providing the destination processor core access to the data.

13. A method comprising:

receiving, at a network communications unit, a communication from a source processor core in a coherent domain to a destination processor core in the coherent domain, the communication including a header containing a destination address associated with the destination processor core, a plurality of processor cores, the source processor core and the destination processor core being one of a plurality of processor cores, at least two processor cores of the plurality of processor cores being coupled outside the coherent domain and at least two processor cores of the plurality of processor cores being coupled in the coherent domain, the coherent domain including multiple caches that store data in different locations such that each different location stores the same data, and the coherent domain maintaining coherency of the data stored in the different locations such that a change to the data stored in a first location of the different locations results in a corresponding change to the data stored in a second location of the different locations, the plurality of processor cores being associated with local addresses and remote addresses, the local addresses being mapped to the remote addresses, the local addresses being employed for communication with the processor cores located in the coherent domain and the remote addresses being employed for communication with the processor cores located outside the coherent domain, and employing the destination address to identify the local address associated with the destination processor core to provide the destination processor core access to data communicated from the source processor core.

14. The method of claim 13, further comprising employing the header to determine network semantics compliance prior to providing the destination processor core access to the data.

15. The method of claim 13, wherein the local addresses are shorter than the remote addresses.

16. The method of claim 13, further comprising:

employing the header to query a policy table to determine rules governing communications between the source processor core and the destination processor core, and enforcing the rules from the policy table when providing the destination processor core access to the data from the source processor core.

17. The method of claim 13, wherein the destination processor core operates a destination virtual machine (VM), and the destination address associated with the destination processor core is a virtual tunnel end point (VTEP) of the destination VM.

18. The method of claim 13, wherein the destination processor core operates a container, and the destination address associated with the destination processor core is a network protocol address of the container.

19. The method of claim 13, wherein providing the destination processor core access to data communicated from the source processor core includes notifying the destination processor core of a location of the data in shared memory.

20. A method comprising:

receiving, at an operating system entity, a request from a source entity to transmit data to a destination entity, the source entity and the destination entity being one of a plurality of entities, at least one entity of the plurality of entities being coupled outside a coherent domain and at least two entities of the plurality of entities being coupled in the coherent domain, the plurality of entities being associated with local addresses and remote addresses, the local addresses being mapped to the remote addresses, the local addresses being employed for communication with the entities located in the coherent domain and the remote addresses being employed for communication with the entities located outside the coherent domain;

determining that the source entity and the destination entity operate in a common coherent domain that includes multiple caches that store data in different locations such that each different location stores the same data and that maintains coherency of the data stored in the different locations such that a change to the data stored in a first location of the different locations results in a corresponding change to the data stored in a second location of the different locations;

identifying the local address associated with the destination entity and generating a communication to the destination entity, the communication including a header containing a destination address comprising the local address associated with the destination entity; and forwarding the header to a network communications unit to provide access to the data.

21. The method of claim 20, further comprising:
storing the data in memory shared by a source processor operating the source entity and a destination processor operating the destination entity; and
forwarding, to the network communications unit, a pointer to the stored data in the shared memory.

22. The method of claim 20, wherein the operating system entity is a kernel, and wherein at least one of the source entity or destination entity is a container.

23. The method of claim 20, wherein the operating system entity is a hypervisor, and wherein at least one of the source entity or destination entity is a virtual machine (VM).

24. The method of claim 20, further comprising setting a local flag in the header to indicate to the network communications unit that the communication is local to the coherent domain.

25. The method of claim 20, further comprising setting a network semantics flag in the header to indicate to the network communications unit that the communication is between processor cores and compliant with network semantics.

* * * * *